May 10, 1960

J. M. SHARP ET AL 2,936,041

PULSATION DAMPENING APPARATUS

Filed June 10, 1955

James M. Sharp
Miles T. Hanchett
James P. Lincoln
Henry W. Simpson
INVENTORS

BY Browning, Simmons & Hyer

ATTORNEYS

May 10, 1960 J. M. SHARP ET AL 2,936,041
PULSATION DAMPENING APPARATUS
Filed June 10, 1955 2 Sheets-Sheet 2

James M. Sharp
Miles T. Hanchett
James P. Lincoln
Henry W. Simpson
INVENTORS

BY Browning, Simmons & Dyer

ATTORNEYS

United States Patent Office 2,936,041
Patented May 10, 1960

2,936,041

PULSATION DAMPENING APPARATUS

James M. Sharp, Miles T. Hanchett, James P. Lincoln, and Henry W. Simpson, San Antonio, Tex., assignors to Southern Gas Association, Dallas, Tex., a corporation of Texas Application June 10, 1955, Serial No. 514,574

18 Claims. (Cl. 181—47)

This invention relates to improved acoustic filters of the general type employed to dampen pulsations in a flowing fluid stream such as those created by a compressor, a blower, internal combustion engine, and the like. In one of its aspects, it relates to such a filter in which the transmission of resonant frequencies between the filter components is reduced. In still another of its aspects, it relates to such a filter in which certain modes of resonant vibration are discouraged or dampened.

Acoustic filters are frequently employed for dampening pulsations in a pulsating gas stream, such as those created by a compressor, internal combustion engine, blower, and the like. and generally comprise a combination of acoustical capacitances and inductances arranged in a filter network. The acoustical capacitances can be formed from large diameter pipes or tanks (frequently termed "bottles") which provide storage volume or "capacity" within the filter. The acoustical inductances can be in the form of smaller diameter pipes or conduits (frequently termed "chokes" or "choke tubes") which provide inertia or "choking action" in the filter. The filter elements may be so connected among themselves and with the pumping device that the fluid pumped will pass throoügh the filter so that its elements contain pulsating flow of fluid in addition to the steady flow of fluid. In other words, the filter elements are connected in series with the pumping device. They may also be connected among themselves and with the pumping device in such a manner that the filter is in effect a "side branch" of the flow line so that it is subject only to simple pulsating flow. This may be spoken of as being connected in shunt when speaking in terms of the analogous electrical components. In any event, flow into or through the filter is the result of the pumping action of the device; that is, fluid is intermittently taken from one filter (the suction filter) and delivered intermittently to another filter (the discharge filter) so that the flow of fluid occurs in more or less discrete pulses. As a result, it can be said that there is imposed upon the steady flow of gas, an acoustic pressure wave having an amplitude, frequency and wave-form dependent primarily upon the nature of the pumping device. In many instances, this pressure wave is of complex wave-form. Thus, for a piston type compressor, the fundamental frequency at which the suction and discharge piping is excited by the action of the piston in pumping gas depends upon the angular velocity of the compressor crank shaft and upon the number of and the crank angle spacing of the compressor pistons. In multi-cylinder compressors where the crank angle intervals between the opening of the several suction or discharge valves is not uniform among the cylinders, more than one such fundamental frequency can be generated by the compressor. Further, the action of valve opening and valve closing, the non-linearity of the gas, the non-sinusoidal motion of the compressor pitsons, the opposing curvature of the compression and expansion pressure-volume curves, etc., all act to distort the shape of the pressure wave or waves generated by the compressor in the suction and discharge piping. Therefore, in addition to certain fundamental frequencies generated by the compressor, there is also generated all harmonics of the fundamental compressor frequency or frequencies, albeit that the amplitude of the higher harmonics (e.g. 10th) may be only a fraction of that of the fundamental. Nevertheless, some of the higher harmonics present as a part of the composite pressure wave generated by the compressor may frequently have pressure amplitudes of sufficient magnitude as to excite standing waves of very large pressure amplitude in any piping having a resonance frequency equal or nearly equal to that of such higher harmonics.

It has been found that though acoustic filters can be designed by procedures theretofore known to have a cut-off frequency below the lowest fundamental frequency generated by a compressor or the like and to effectively dampen pressure waves of many different frequencies, the frequency response curve of such filters exhibits pass bands of frequencies having excessively large amplitudes. As a matter of fact, the filter often tends to amplify the magnitude of certain frequencies so that, as to such frequencies, the filter is a hinderance rather than a help in decreasing vibration in piping systems.

It has been found that the frequencies passed with or without magnification by the filter, are those with which one or more of the filter components are in resonance. As indicated above, a compressor generates practically all harmonics of its fundamental frequency so that it is almost impossible to size the filter components to be non-resonant with all frequencies in the composite compressor output pressure wave. Moreover, due to the fact that compressors usually have a range of operating speeds, it is even impractical or impossible to size the components for non-resonance with the lower harmonics which have sufficient amplitude to excite sizeable standing waves. However, it is desirable to eliminate as many as possible of the pass band frequencies from the frequency response curve of the filter, even though its elements may be in resonance with some of the input frequencies thereto, and such is a general object of this invention.

Another general object is to provide an acoustic filter which can not only have a desired low cut-off frequency (i.e. be a low pass band filter) but which will not pass bands of higher frequencies of excessive amplitude to its output.

It is another general object of this invention to provide an acoustic filter through which there is a minimum of transmission of pulsing sound energy even though the filter be fed with pressure waves of complex harmonic structure.

Another object is to provide an acoustic filter for dampening pulsations in fluid systems wherein an arrangement of an acoustical capacitance and inductance is such that transmission of frequencies with which one or more of the filter components are in resonance is minimized.

Another object is to provide an acoustic filter in which the transmission of resonant frequencies between the filter components is minimized by arranging the components to have flow junctures with each other at nodal points of any standing wave tending to exist in the components thereby reducing or eliminating from the filter frequency response curve, the resonant peaks corresponding to the resonant frequencies of the filter elements.

Another object is to provide an acoustic filter including an acoustical capacitance and inductance means interconnected so that a flow juncture with an acoustical capacitance means is at a distance $$\frac{L}{2^n}$$

from the end of such capacitance means, where L is the length thereof and $n$ is an integer, whereby either the transmission from one filter element to another of sound energy from standing waves having nodes at such juncture is reduced or substantially eliminated or such standing waves are suppressed by interference.

Another object is to provide such a filter in which the various acoustical capacitance and inductance units can be arranged so that a selected one, or a combination of more than one, of the units will be subjected to the major portion of the mechanical vibration resulting from the filtering action while other filter units and associated piping are isolated from any substantial mechanical vibration.

Another object is to provide an acoustic filter of the series type wherein the flow inlet to one or more of the acoustic capacitances is at a node of a standing wave tending to be existent in such capacitance whereby the magnitude of such standing wave is decreased by destructive interference with an incoming wave.

Another object of the invention is to provide a band elimination filter of the resonator type having a maximum efficiency in eliminating selected frequencies.

Another object is to provide such a band elimination filter in which the filter elements are connected to the steady flow line at a point such that an optimum amount of pulsing energy at the frequency to be eliminated is alternately stored in and released by the filter.

Other objects, advantages and features of this invention will be apparent to one skilled in the art upon a consideration of the written specification, the appended claims and the attached drawings wherein:

Figures 1, 2:
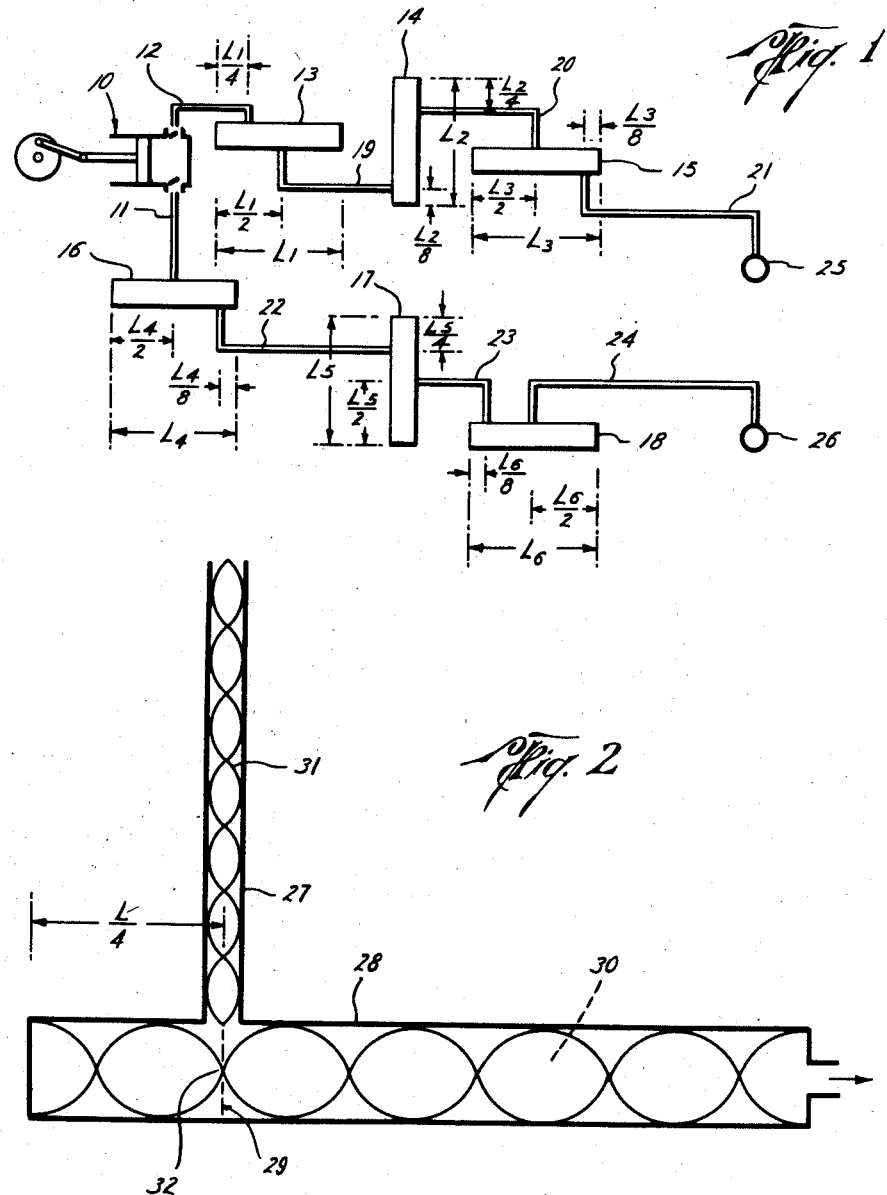
Fig. 1 is a schematic illustration of a compressor having acoustic filters arranged in its suction and discharge piping system in accordance with this invention.
Figs. 2 and 3 are diagrammatic illustrations of acoustic filter elements arranged to illustrate certain principles of this invention.

In accordance with this invention, standing waves in an acoustical capacitance means of a filter are suppressed by locating the flow inlet to the capacitance means at a point along its length corresponding to a pressure minimum or node of the standing wave to be suppressed. By proper location of the flow juncture between such inlet and capacitance, an entire family of standing waves can be suppressed. As another facet of this invention, the transmission of wave energy from a standing wave in an acoustical capacitance to an outlet conduit, such as an acoustical inductance, is minimized by positioning the juncture therebetween at a pressure node of the standing wave. Here again, proper location of such juncture along the length of the capacitance can minimize the transmission of sound energy from an entire family of standing waves. As will be shown hereinafter, certain combinations of such locations can eliminate resonant peaks from the filter frequency response curve for many of the frequencies with which the filter elements are in resonance and which would otherwise be transmitted by the filter. Before turning to the details of the arrangements above generally described, it should be pointed out that a preferred form of filter constructed in accordance with this invention will have (1) the resonant frequencies of its components separated as far as possible from the predominant (fundamental and lower harmonics thereof) frequencies of the pumping device or compressor, (2) standing waves in the acoustical capacitances suppressed by proper location of inlets thereto and (3) transmission of wave energy from one filter component to another controlled by proper location of junctures therebetween.

In discussing each of these three structural arrangements in detail, each will be discussed separately in the above order with appropriate theory being given.

Every junction between pipes of different diameters acts as a reflection point for an acoustic pressure wave traveling through the pipes. An example of such junction is that between an acoustic choke or inductance and an acoustic capacitance in a filter, these elements commonly being constructed of pipe. It has been found that the resonant frequencies of the larger of the pipes (capacitance or bottle) are those of an excited pipe essentially closed at both ends while the resonant frequencies of the smaller of the two pipes (choke) are those of an open ended organ pipe. The large pipe or bottle tends to establish standing waves which create a pressure maximum at the ends of the bottle while the small diameter pipe or choke tends to establish standing waves having a pressure minimum or node at the ends of the pipe. In either case, the frequencies at which the pipes are resonant to produce the standing waves therein are related to the length of the particular pipe by $F_N = NV/2L$, where $F_N$ is a resonant frequency, N is an integer, V is the velocity of sound in the fluid and L is the acoustic length of the pipe.

This relationship holds in those instances where (1) the pipe diameter is small compared with the wave length of the sound in the pipe (less than approximately 1/20 of the wave length of the sonic vibration in question) and (2) the pipe length is of the same order of magnitude or longer than the wave length of the sound. Thus, it can be seen that standing waves are established in gas-filled pipes (such as those comprising acoustic filter elements) at a frequency dependent upon the length of the pipe.

In accordance with the preferred form of this invention, the lengths of the various components of the acoustic filter including associated piping are chosen so that the resonant frequencies of the components and of any in-line combination of the components are separated as far as possible from the dominant frequencies (e.g. fundamental and lower harmonics thereof, as well as subharmonics where existent) generated by the compressor. In so doing, the fundamental pulsation frequency of the compressor is first determined or calculated as being equal to the number of pulses of gas taken from the suction line and discharged into the discharge line by the compressor per second. For example, a compressor consisting of $n$ double acting cylinders, which reach the top dead center or some other common reference point at equal intervals of crank shaft angular position and which have dimensions of piston and cylinder such that an identical mass of gas is moved by each of the head and crank ends, would deliver $2n$ equally spaced pulses per revolution of the crank shaft. Therefore, if the crank shaft makes $m$ revolutions per second, the fundamental pulsation frequency delivered to the suction and discharge piping is $2nm$ pulses per second. This fundamental frequency and the first few harmonics thereof are those which predominate in the frequency spectrum of the pressure pulses delivered to an acoustic filter in the suction or discharge piping of the compressor. The lengths of the various components of the filter at which the components will be in resonance with the fundamental and first few harmonics (e.g. first to fourth) can be determined from the formula $$L = \frac{NV}{2F_N}$$

where L is the acoustic length of a component, N is an integer chosen to be 1 for the fundamental frequency, 2 for the first harmonic, 3 for the second harmonic, etc., V is the velocity of sound in the gas, and $F_N$ is the fundamental or harmonic frequency of the compressor. Any one component can be in resonance at any or all of the frequencies corresponding to $N = 1, 2, 3, 4, \ldots$ and standing waves can exist in the component for all such frequencies. The amplitude of each standing wave is dependent upon the frequency and amplitude of the pressure pulses which excite the component. Thus, if the component is excited by a pressure wave of a frequency equal to or near one of its resonant frequencies with an amplitude equal to or greater than that necessary to sustain a standing wave at such frequency, very large amplitude standing waves are established. To avoid this, the various filter components, insofar as possible, are chosen to have a length such that they will be out of resonance with the fundamental and first few harmonics thereof.

Of course, under actual operating conditions, the compressor speed $m$ can be expected to vary through a range of speeds thereby yielding bands of fundamental and harmonic frequencies which must be considered. Since the band width increases with the order of the harmonics, it may not, in many instances, be possible to choose lengths of filter components out of resonance with all of the lower order harmonics but, in accordance with the above, the acoustic length of the filter components, insofar as possible, are chosen to be out of resonance with as many frequencies as possible.

Of course, the components of the filter, that is, the acoustic capacitances and inductances, are sized as to volume, area ratios, etc., to control the value of the low cut-off frequency of the filter and then the length of the components selected in accordance with the above. The method of sizing such components to obtain a particular value of cut-off frequency is well known to those skilled in the art and need not be considered further here.

Now referring to Fig. 1, there is shown a compressor 10 having suction and discharge nozzles 11 and 12. Connected with these nozzles (which can themselves be sized to act as acoustical inductances) are suction and discharge filters of the series type. While there are several possible arrangements of acoustical capacitances and inductances to form a filter, there is shown a series of acoustical capacitances in the form of bottles or chambers 13, 14 and 15 on the discharge side of the compressor and bottles or chambers 16, 17 and 18 on the suction side. Interconnecting these bottles are acoustical inductances or chokes in the form of conduits 19, 20 and 21 on the discharge side and conduits 22, 23 and 24 on the suction side. Each of these conduits is of a relatively smaller cross-sectional area than that of the bottles. Conduit 21 connects with pipe line 25 into which the compressor discharges and conduit 24 connects with pipe line 26 from which suction is taken and each of conduits 21 and 24 can be treated as inductances. As indicated above, the various acoustical capacitances (bottles) and acoustical inductances (chokes) are sized so that the bottle volume, choke length, area ratios of the chokes and bottles, etc., are utilized to determine the value of the low cut-off frequency of the entire filter on the suction and discharge sides of the compressor. Also as indicated above, the fundamental frequency of compressor 10 is determined and then the lengths of the elements 11 through 24 are made to be such that, insofar as possible, they will individually not be in resonance with any one of the fundamental frequencies and low harmonics thereof generated by the compressor over its range of speeds. It is to be recognized, however, that because a range of frequencies are involved due to variations in compressor speed and because the range of resonant pipe frequencies are involved due to variations in the speed of sound in the gas or fluid, it may not be possible to provide lengths of all the components such as to be out of resonance with all frequencies involved by a satisfactory amount. However, the lengths of the filter and piping elements are made such that the elements are not in resonance with as many of the frequencies as is possible and practical.

In accordance with another aspect of this invention, the frequencies generated by the compressor which tend to establish standing waves in the acoustical capacitances or bottles are suppressed by connecting the flow inlet to the bottle to have a flow juncture therewith at a pressure minimum or node of the standing wave tending to be established in the bottle. In general, this flow juncture is located $$\frac{L}{2^n}$$

distance from one end of the bottle, where L is the acoustic length of the bottle and $n$ is an integer (1, 2, 3, 4, 5 . . .). Thus, as stated above, the bottles are in resonance at frequencies ($F_N$) as determined by the formula $$F_N = \frac{NV}{2L}$$

Since the bottle acts as an excited pipe essentially closed at both ends, the standing wave pattern must be such that pressure maxima occur at the ends of the bottle. For all odd values of N, the standing wave pattern must be such that a pressure minimum, or node, occurs at the center of the bottle $$\left(\frac{L}{2}\right)$$

For one-half of the even values of N (for $N=2P$ where P is an odd integer), the standing wave pattern must be such that a pressure minimum or node occurs at distances $$\frac{L}{4}$$

from each end of the bottle.

In accordance with this invention, the establishment of these standing waves is suppressed by connecting the nozzles or flow inlets to the expansion bottles at one of the distances of $$\frac{L}{2}, \frac{L}{4}, \frac{L}{8}, \ldots$$

from the ends of the respective bottles. Thus, referring to Fig. 2, flow inlet 27 to a bottle 28 has a juncture therewith lying in plane 29. A standing wave form 30 with an $N=6$ has been shown in the bottle and standing wave form 31 in conduit 27. It will be noted that in accordance with the above, the juncture of conduit 27 is at a pressure minimum or node 32 of the standing wave in bottle 28. This particular juncture is at a distance of $$\frac{L}{4}$$

from the end of bottle 28 and therefore standing waves having N values of 2, 6, 10, 14, 18, . . . are suppressed by interference. By situating inlet conduit 27 to have a juncture at the mid point of bottle 28, standing waves which correspond to odd values of N would be suppressed. Similarly, by making the inlet juncture at $$\frac{L}{8}$$

distance from the end of the bottle, standing waves having N values of 4, 12, 20, . . . would likewise be suppressed.

As will be evident from Fig. 1, a plurality of bottles can have their inlets 12, 19 and 20 respectively situated for different distances from the ends of the respective bottles according to the formula $$\frac{L}{2^n} \text{ such as } \frac{L_1}{4}, \frac{L_2}{8} \text{ and } \frac{L_3}{2}$$

thereby suppressing by interference standing waves having odd values of N, as well as those having even values of 2, 4, 6, 10, 12, 14, 18, 20, . . .

The same type of juncture location for suppression of standing waves can be employed in the suction filter as indicated in Fig. 1 for the junctures of conduits 24, 23, and 22 with bottles 18, 17 and 16, respectively.

As pointed out above, this invention affords a filter in which the transmission of resonant frequencies between the filter and piping elements is minimized through suitable location of the flow junctures of the outlets from the various acoustical capacitances or bottles. It has been established that the pressure in the medium transmitting sonic vibrations must be continuous across any plane within the medium. Therefore, the pressure across the plane taken at that cross-section of the filter elements at which those of different diameter form a junction, must be continuous. If an acoustical inductance or small diameter choke forming an outlet from a larger diameter capacitance or bottle is situated to have a flow juncture with such bottle at the mid point of its length, it is joined to a point of minimum pressure amplitude for all standing waves in the bottle having frequencies corresponding to odd values of N in the formula $$F_N = \frac{NV}{2L}$$

Figure 3:
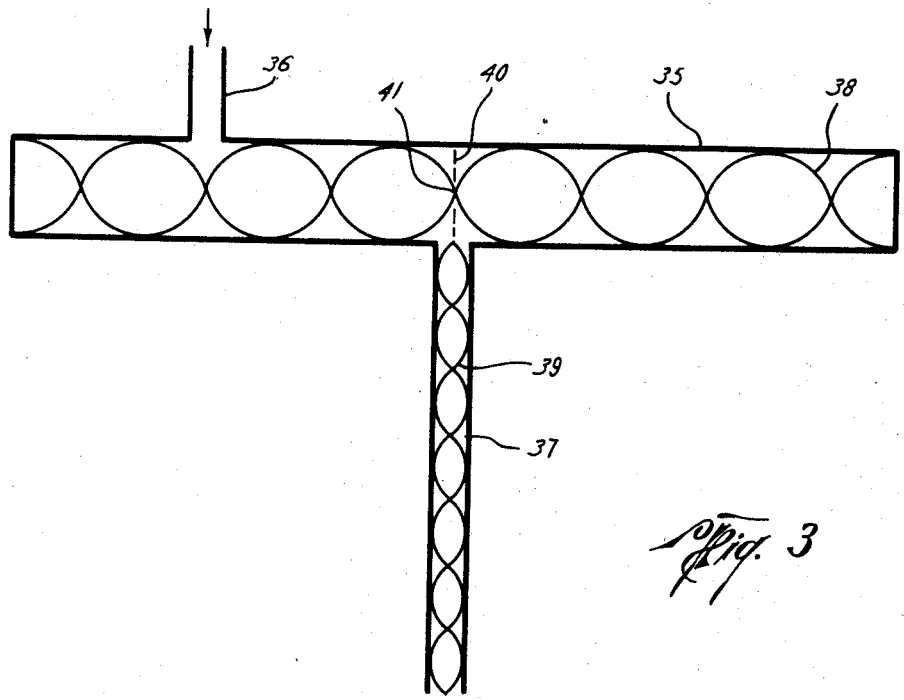

Since the pressure must be continuous across a plane lying at the juncture, the coupling of pressure pulsations at such frequencies into the choke is minimized and therefore the transmission of the wave energy of such pulsations to the next bottle or other piping is likewise minimized. Such an arrangement is demonstrated in Fig. 3 where a bottle 35 is shown with a flow inlet 36 and an outlet 37 which can be a choke. A standing wave 38 having an N value of 7 is shown in the bottle and another standing wave 39 in choke 37. The latter is connected to form a flow juncture at the mid point of the length of bottle 35 so that the plane 40 of the juncture intersects a pressure node 41 of wave 38. Accordingly, transmission of sound energy by wave 38 into choke 37 is minimized and theoretically can be made to be zero. Accordingly, transmission of sound energy by all standing waves having an N value equal to an odd integer is minimized by the arrangement of Fig. 3. Similarly, by moving choke 37 to have its juncture with bottle 35 at a distance from one end of the bottle equal to $$\frac{L}{4}$$

(where L is the length of the bottle), transmission of sound energy by standing waves having N values of 2, 6, 10, 14 . . . is minimized.

Therefore, in accordance with one aspect of this invention, the flow outlets from the acoustic capacitances are connected as to have flow junctures therewith at distances $$\frac{L}{2^n}$$

from one end of the capacitances, where L is the length of the acoustical capacitances and $n$ is an integer. Where a multiplicity of capacitances are employed in a filter, the outlet flow junctures with the various capacitances can be situated so that each is different from the others in its distance from the end of its capacitance by making each juncture at a location corresponding to a different value of $n$. Thus, referring to Fig. 1 again, choke 19 is connected to bottle 13 at $$\frac{L_1}{2}$$

distance from the end of the bottle. As a result, transmission of sound energy from standing waves having odd values of N will be minimized. Similarly, choke 20 is connected to the bottle 14 at a distance $$\frac{L_2}{4}$$

from the end so that transmission of sound energy from standing waves having even N values corresponding to the series 2, 6, 10, 14, . . . is likewise minimized. Still further, choke 21 is connected to capacitance 15 at a distance $$\frac{L_3}{8}$$

from the end of the capacitance to minimize transmission of sound energy from standing waves having N values of 4, 12, 20, . . .

On the suction side of compressor 10, the inlet filter can have a similar arrangement in that chokes 23, 22 and 11 are respectively connected to capacitances 18, 17 and 16 at distances equal to $$\frac{L_6}{8}, \frac{L_5}{4}, \text{ and } \frac{L_4}{2}$$

from the ends of the respective capacitances.

With the foregoing arrangement, only a very few frequencies generated by the compressor can be transmitted through the filter.

In the most preferred filter arrangement, the acoustic lengths of the various capacitances and inductances are made equal to each other or are multiples of some basic length so that only a single resonance frequency need be dealt with. Then by arranging the flow junctures as above taught, the transmission of resonance peaks through the filter is satisfactorily prevented.

Thus, in a low band pass acoustic filter, there is usually employed two bottles interconnected by a choke. It is usually preferred to situate the outlet flow junctures of each of the bottles at the mid point of the bottle's length and each of the inlet flow junctures at one-fourth the length of the bottles from the bottle's ends. In such an arrangement, the mid point connections tend to prevent transmission of wave energy from standing waves having odd modes of vibration and the one-quarter connections tend to suppress one-half the even modes of vibration including the important second harmonic. Since there are, in effect, two mid point junctures in series, very little, if any, wave energy from standing waves of odd modes of vibration can be transmitted through the filter. Thus, even though the amplitude of the standing waves in the first bottle is quite large and even though the mid point outlet juncture with such bottle is not completely effective so that some energy is transmitted to the second bottle, the amplitude of the standing waves thereby excited in the second bottle will be relatively small. Accordingly, the outlet flow juncture with the second bottle, even though it too is not completely effective, will still further reduce the amount of energy transferred to the piping.

The same is true of the inlet flow junctures because even though the inlet juncture with the first bottle does not entirely prevent the establishment of standing waves therein corresponding to N equals 2, 6, 10, etc., the inlet juncture with the second bottle still further suppresses their formation in the second bottle so that the resultant energy transferred to the piping is insignificant.

On the other hand, if several different acoustic lengths of chokes and bottles are chosen for the several components of the filter, several resonance peaks will tend to be present in the frequency response curve for the filter. Any one of these peaks (and harmonics of the corresponding frequency) can be reduced by proper junction location. However, from a practical standpoint, it will be necessary to provide at least one set of mid point and quarter point connections for each different length of choke or bottle to take care of the resonant frequencies of such lengths. This may be physically impossible (i.e. where the lengths are all different) or may require an excessive number of chokes and bottles.

The fact that a single juncture, either inlet or outlet, may not be completely effective for its intended purpose as above indicated, i.e. it may not result in complete suppression of a standing wave or it may permit some energy to be transmitted from a bottle, may be because the juncture is not a true plane lying exactly at a node of a standing wave, i.e. the "tuning" is not sharp. This may arise from: (1) the gaseous medium is moving through the bottle so that the speed of wave travel through the bottle is greater in one direction than in an opposite direction; (2) the ends of the bottle frequently are not planar but the ends may be cup or dish shaped thereby causing "slurring" of the resonant frequency of the bottle; (3) the choke may not terminate in a plane normal to the longiutdinal axis of the bottle but may extend into the bottle from the side thereof so that the end of the choke lies in a plane parallel to the axis of the bottle or has some finite width along the length of the bottle whereby the choke-bottle flow juncture extends to either side of a node. Accordingly, from a practical standpoint, it is often preferred to use two mid point and quarter point junction combinations in series with each other to effect maximum filter efficiency. This can be most simply accomplished when the filter elements are all of equal acoustic lengths since only a minimum number of junctures are then required.

It should also be pointed out that when a choke is made of equal acoustic length to that of a bottle from which it conducts flowing gas, any transfer of energy from a standing wave in the bottle to the choke tends to set up a standing wave in the choke. Such a standing wave has a pressure node at the outlet end of the choke so that only a minimum, if any, energy from the standing wave in the choke is transferred out of its outlet end. In other words, the energy is "reflected" from the outlet end back towards the inlet end. As a result, a very little energy at the resonant frequency of the choke can be transferred to succeeding piping. However, here again, the choke may not terminate at its outlet end exactly at a node so that the reflection may not be complete.

It is also possible by this invention to select a bottle or choke which is to be subjected to the maximum amount of mechanical vibration arising from the filtering action while vibration in other bottles or chokes is minimized. Thus, if the second bottle away from the compressor is to be subjected to the maximum vibration in dampening standing waves, the junctures to it will be connected at its mid and quarter points, for example, while the junctures with the other bottles are connected at points other than those corresponding to a pressure node. In other words, the junctures with the other bottles are such that standing waves are not suppressed therein.

Figure 4:
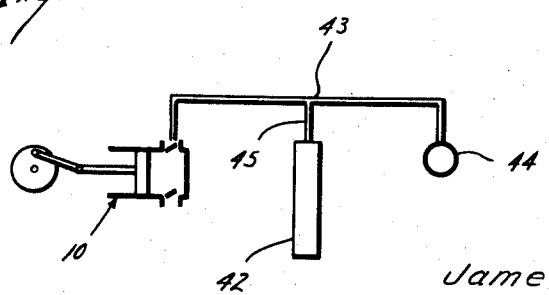
Fig. 4 is a view showing an acoustic resonator or band elimination filter connected to a flow line.

Referring now to Fig. 4, there is shown a band elimination filter (resonator) comprising a bottle 42 connected as a side branch (in "shunt") to a compressor discharge line 43. The discharge line is connected to a pipe line 44 or to other elements of an acoustic filter. In this arrangement, bottle 42 can be connected through a choke 45 to the flow line so that steady flow from the compressor does not pass through the bottle or choke but instead, the bottle and choke are subject only to pulsing flow. Such a filter is designed to temporarily store pulsations of a given frequency and to reintroduce these pulsations into the flow line to which it is coupled 180° out-of-phase with the original pulsations. This out-of-phase introduction of pulsations has the effect of smoothing out the original pulsations in the flow line.

For the resonator to have maximum effect at a particular frequency, it must be coupled to the steady flow piping at a point where the pressure variation for that particular frequency is greatest. By connecting at a point of peak pressure variation (e.g. at an antinode), an optimum amount of pulsating energy at the frequency to be eliminated is alternately stored and released by the side branch filter into the system. Thus, if the steady flow system comprising piping 43 is resonant to a particular frequency in the output of compressor 10, the side branch filter is connected at a point along the length of pipe 43 corresponding to an antinode of the standing wave therein. The acoustic length of the side branch filter is such that pulses are reintroduced 180° out-of-phase with the original pulsations.

Reference has been made herein to "acoustic length." This term is meant to include the actual length of the choke, bottle or pipe plus a length to correct for the end effect of the choke, bottle or pipe. While the acoustic length is preferably employed as L in the above formulas, it may be possible in some instances to use the actual length and yet realize the advantages of this invention to a lesser degree.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for dampening pulsations in a fluid stream having pulsating flow created by a fluid pumping device generating an acoustic pressure wave of complex harmonic structure and for minimizing transmission of pulsating sound energy from the device which comprises: means including acoustical capacitance and acoustical inductance units having connections with each other to form a fluid pulsation dampening filter and also having connections to apply the pulsating flow of said fluid stream to the filter, said acoustical capacitance unit being of an acoustic length L as to be resonant with at least one of the fundamental and harmonic frequencies of said pressure wave to thereby cause a standing wave in said capacitance unit at such one frequency, one connection with said capacitance unit forming a juncture therewith at a location which is $$\frac{L}{2^n}$$

distance from one end of the capacitance unit, $n$ being an integer.

2. Apparatus for dampening pulsations in a fluid stream having pulsating flow created by a fluid pumping device generating an acoustic pressure wave of complex harmonic structure and for minimizing transmission of pulsating sound energy from the device which comprises: a pair of acoustical capacitance units with at least one of the units having a length as to be resonant with at least one of the fundamental and harmonic frequencies comprising said pressure wave to thereby form a standing wave in such unit at such frequency, means forming an acoustical inductance gas passage means interconnecting said capacitance units, said acoustical inductance means having a flow juncture with said unit having said standing wave therein at a location $$\frac{L}{2^n}$$

feet from one end of such unit, where L is the acoustic length of the unit in feet and $n$ is an integer.

3. The apparatus of claim 2 wherein said juncture is at the mid point of the acoustic length of the unit to thereby minimize transmission to said acoustical inductance means of pulsating sound energy from standing waves having a pressure node at such mid point.

4. The apparatus of claim 3 in combination with gas passage means connected to the other of said units to provide a flow juncture therewith at a location $$\frac{L_1}{2^{n'}}$$

feet from one end of such other unit, where $L_1$ is the acoustic length of such other unit in feet and $n'$ is an integer having a value greater than unity to thereby suppress transmission from such other unit of at least some of the standing waves therein having even modes of vibration.

5. Apparatus for dampening pulsations in a fluid stream having pulsating flow created by a fluid pumping device generating an acoustic pressure wave of complex harmonic structure and for minimizing transmission of pulsating sound energy from the device which comprises: a pair of acoustical capacitance units and acoustical inductance units connecting between said acoustical capacitance units for fluid flow therebetween and with the acoustical capacitance units forming a pulsation dampening filter, a flow connection to the filter, one of said acoustical capacitance units being of a length as to be resonant with at least one of the fundamental and harmonic frequencies comprising the pressure wave thereby tending to form a standing wave in said one acoustical capacitance unit, said acoustical inductance unit having a flow juncture with said one acoustical capacitance unit at a location therein at which a pressure node of said standing wave occurs thereby minimizing transmission of pulsating sound energy to said acoustical inductance unit at a frequency corresponding to that of said standing wave.

6. The apparatus of claim 5 wherein said one acoustical capacitance unit has a relatively smaller flow connection for discharge of fluid into said one unit, said flow connection having a flow juncture with said one unit at a location corresponding to a pressure node of the standing wave in said one unit thereby dampening by interference said standing wave.

7. The apparatus of claim 6 wherein the other of said acoustical capacitance units is also of a length as to be resonant with at least one of the fundamental and harmonic frequencies of the pressure wave thereby permitting a standing wave to be formed therein, and a flow connection with said other acoustical capacitance unit having a flow juncture therewith at a location corresponding to that of a pressure node of said standing wave in said other acoustical capacitance unit.

8. The apparatus of claim 7 wherein said acoustical inductance unit has a flow juncture with said other acoustical capacitance unit at a location therein at which a pressure node of said standing wave occurs in said other unit thereby dampening by interference said standing wave therein.

9. The apparatus of claim 5 wherein said acoustical capacitance units and said acoustical inductance units are related as to the acoustic length of each by the following formula:

$$L_1 n \text{ is equal to } L_2 n' \text{ is equal to } L_3 n''$$

wherein $L_1$, $L_2$ and $L_3$ are the respective acoustic lengths of the units, and $n$, $n'$ and $n''$ are integers, whereby transmission through the filter of pressure wave frequencies with which the units are resonant is suppressed.

10. The apparatus of claim 9 wherein $n$, $n'$, and $n''$ are equal to each other.

11. Apparatus for dampening pulsations in a fluid stream having pulsating flow created by a fluid pumping device generating an acoustic pressure wave of complex harmonic structure and for minimizing transmission of pulsating sound energy from the device which comprises: a pulsation dampening filter including a pair of relatively large acoustical capacitance chambers interconnected by a relatively small conduit forming an acoustical inductance between the chambers and having flow junctures with each chamber, said chambers and inductance conduit each having a length as to be out of resonance with at least said fundamental frequency and in resonance with a higher harmonic frequency thereby tending to form a standing wave therein at such higher frequency, a flow connection having a flow juncture with one of said chambers, at least one of the flow junctures with said chambers being at a distance from one end thereof of $$\frac{L}{2^n}$$

where L is the acoustic length of such chamber and $n$ is an integer.

12. The apparatus of claim 11 wherein said flow connection juncture is at a distance of $$\frac{L_1}{2^n}$$

from one end of said one chamber and said acoustical inductance conduit juncture with the other chamber is at $$\frac{L_2}{2^n}$$

distance from one end of said other chamber, where $L_1$ and $L_2$ are the acoustic lengths of said one and other chambers, respectively, and are equal, and where $n$ is 1 in one instance and an integer larger than 1 in the other instance.

13. The apparatus of claim 12 where $n$ is 2 in said other instance.

14. The apparatus of claim 12 wherein the juncture of said inductance conduit with said one chamber is at a location corresponding to a pressure node of a standing wave therein.

15. The apparatus of claim 11 which includes a flow connection with the other of said chambers and having a flow juncture therewith at a distance of $$\frac{L_2}{2^n}$$

from one end of said other chamber and wherein said acoustical inductance conduit juncture with said one chamber is at $$\frac{L_1}{2^n}$$

distance from one end of said one chamber, where $L_1$ and $L_2$ are the acoustic lengths of said one and other chambers, respectively, and are equal, and where $n$ is 1 in one instance and an integer larger than 1 in the other instance.

16. The apparatus of claim 15 wherein $n$ is 2 in said other instance.

17. The apparatus of claim 15 wherein the juncture of said acoustical inductance conduit with said other chamber is at a location corresponding to a pressure node of the standing wave therein.

18. Apparatus for dampening pulsations in a fluid stream having pulsating flow created by a fluid pumping device generating an acoustic pressure wave of complex harmonic structure and for minimizing transmission of pulsating sound energy from the device which comprises: a flow line for said stream, an acoustical capacitance coupled to said flow line as a side branch and thereby subjected to pulsating flow only, the capacitance being coupled to said flow line at an antinode of a standing wave tending to exist in the flow line, said side branch having an acoustic length such that pulsating waves of pressure passing thereinto from the flow line are reflected back to the flow line 180° out-of-phase with said standing wave.

References Cited in the file of this patent

UNITED STATES PATENTS

| | | |
|---|---|---|
| 1,910,672 | Bourne | May 23, 1933 |
| 2,043,030 | Bourne | June 2, 1936 |
| 2,075,088 | Blanchard | Mar. 30, 1937 |
| 2,078,754 | Day | Apr. 27, 1937 |
| 2,198,021 | Wood | Apr. 23, 1940 |
| 2,241,010 | Chipley | May 6, 1941 |
| 2,405,100 | Stephens | July 30, 1946 |
| 2,429,297 | Rudolph | Oct. 21, 1947 |
| 2,474,553 | Stephens | June 28, 1949 |
| 2,474,555 | Stephens | June 28, 1949 |
| 2,501,751 | Aldridge | Mar. 28, 1950 |
| 2,570,241 | Hutchinson | Oct. 9, 1951 |
| 2,620,969 | Stephens | Dec. 9, 1952 |
| 2,765,044 | Hatte | Oct. 2, 1956 |